United States Patent
Li et al.

(10) Patent No.: US 12,519,556 B2
(45) Date of Patent: Jan. 6, 2026

(54) METHOD OF HIGH PRECISION TIME SYNCHRONIZATION BETWEEN A DEVICE-SIDE TIME-SENSITIVE NETWORKING (TSN) TRANSLATOR (DS-TT) AND A TSN GRANDMASTER (GM)

(71) Applicant: Hong Kong Applied Science And Technology Research Institute Co., Ltd., Hong King (HK)

(72) Inventors: Wei Li, Shatin (HK); Jianjun Zhang, Shatin (HK); Liang Xia, Shatin (HK); Liang Dong, Tai Po (HK)

(73) Assignee: Hong Kong Applied Science And Technology Research Institute Co. Ltd, Shatin (HK)

( * ) Notice: Subject to any disclaimer, the term of this patent is extended or adjusted under 35 U.S.C. 154(b) by 306 days.

(21) Appl. No.: 18/226,421

(22) Filed: Jul. 26, 2023

(65) Prior Publication Data

US 2025/0038872 A1   Jan. 30, 2025

(51) Int. Cl.
*H04J 3/06*   (2006.01)
*H04W 56/00*   (2009.01)

(52) U.S. Cl.
CPC .......... *H04J 3/0667* (2013.01); *H04J 3/0673* (2013.01); *H04J 3/0682* (2013.01); *H04J 3/0697* (2013.01); *H04W 56/001* (2013.01)

(58) Field of Classification Search
None
See application file for complete search history.

(56) References Cited

U.S. PATENT DOCUMENTS

2021/0359778 A1* 11/2021 Wang ................. H04L 69/28
2021/0367695 A1   11/2021 Moon et al.
(Continued)

FOREIGN PATENT DOCUMENTS

EP   4160947 A1   4/2023
WO   2021219227 A1   11/2021
(Continued)

OTHER PUBLICATIONS

Kang et al, "Time-Sensitive Networking Technologies for Industrial Automation in Wireless Communication Systems", Energies, 2021, 14, 4497, Publisher: MDPI.
(Continued)

*Primary Examiner* — Alpus Hsu
(74) *Attorney, Agent, or Firm* — GableGotwals

(57) ABSTRACT

A method of time synchronization between a DS-TT module inside a logical TSN bridge of a communication network with a TSN Grandmaster (GM) in a TSN Time Domain of the communication network. The method comprises, at a NW-TT module inside the logical TSN bridge, determining a frequency rate ratio between a Time Domain clock frequency ($f_{5GS}$) and a TSN Time Domain clock frequency ($f_{TSN}$). Then, using the frequency rate ratio and respective times of receipt of a TSN GM synchronization message at an ingress port of the NW-TT module and at an ingress port of the DS-TT module to determine a DS-TT ingress residence time ($R_{DS-TT}$). Then, using the $R_{DS-TT}$ to synchronize the DS-TT module with the TSN GM.

15 Claims, 9 Drawing Sheets

(56) References Cited

U.S. PATENT DOCUMENTS

| | | | |
|---|---|---|---|
| 2022/0030530 A1* | 1/2022 | Munz | H04J 3/0667 |
| 2022/0216932 A1 | 7/2022 | Wang et al. | |
| 2022/0394647 A1 | 12/2022 | Moon et al. | |
| 2023/0040220 A1* | 2/2023 | Qiang | H04W 52/028 |
| 2023/0291489 A1* | 9/2023 | Li | H04J 3/12 |
| 2024/0243829 A1* | 7/2024 | Wei | H04J 3/0644 |
| 2024/0283555 A1* | 8/2024 | Xia | H04W 56/0015 |

FOREIGN PATENT DOCUMENTS

| | | |
|---|---|---|
| WO | 2021238685 A1 | 12/2021 |
| WO | 2023000241 A1 | 1/2023 |

OTHER PUBLICATIONS

Striffler et al, "The 5G Transparent Clock: Synchronization Errors in Integrated 5G-TSN Industrial Networks", chapter II, Apr. 23, 2021, Publisher: IEEE Xplore 19th International Confernec eon Industrial Informatics.

* cited by examiner

PRIOR ART

METHOD OF HIGH PRECISION TIME SYNCHRONIZATION BETWEEN A DEVICE-SIDE TIME-SENSITIVE NETWORKING (TSN) TRANSLATOR (DS-TT) AND A TSN GRANDMASTER (GM)

FIELD OF THE INVENTION

The invention relates to a method of high precision time synchronization between a Device-Side Time-Sensitive Networking (TSN) Translator (DS-TT) and a TSN Grandmaster (GM). The invention is particularly useful for TSN technologies in wireless communication systems including 5G wireless communication systems.

BACKGROUND OF THE INVENTION

Fifth-generation (5G) wireless communications and Time-Sensitive Networking (TSN) are key technologies for, for example, industrial communications such as 5G for wireless connectivity and TSN for wired connectivity. In addition to enhanced mobile bandwidth, 5G supports communications with unprecedented reliability and very low latency, as well as massive Internet of Things (IoT) connectivity.

TSN comprises a collection of Ethernet standards introduced by the Institution of Electrical and Electronic Engineers (IEEE) 802.1 group, defining mechanisms for deterministic communication over wired Ethernet links enabling guaranteed packet transport with bounded latency, low packet delay variation, and extremely low packet loss. Both technologies have been designed to provide converged communication for a wide range of services on a common network infrastructure. Significant benefits can be achieved by enabling TSN and 5G to work together.

For a seamless integration between a 5G system (5GS) and a TSN system, it was proposed by the 3rd Generation Partnership Project (3GPP) that the two systems interoperate in a transparent manner to minimize impact on other TSN entities. Therefore, the 5G system acts as one or more virtual TSN bridges of the TSN network. This virtual bridge model defines several gateways between the TSN and the 5G system including a network-side TSN translator (NW-TT) on the user plane function (UPF) side.

The Precision Time Protocol (PTP) or Generalized PTP (gPTP) is a computer networking protocol for synchronizing network elements' clocks. It is an important part of 5G mobile networks which require accurate time sources. The PTP or gPTP is a protocol used to synchronize clocks throughout the communication network, achieving clock accuracy in the sub-microsecond range, making it the perfect choice where strict time synchronization requirements must be met.

A PTP or gPTP system is formed by a clock source, a Grandmaster (GM), that transmits synchronization information toward multiple clock targets (slave devices).

IEEE 802.1AS comprises the IEEE "Standard for Local and Metropolitan Area Networks—Timing and Synchronization for Time-Sensitive Applications" in local and metropolitan area networks using gPTP. GM/Slave refers to the timing source in the network being generated by a gPTP GM. The Slave clock utilizes an offset to adjust its time to agree with the Master clock. Other than offset adjustment, the clock frequency of the Slave should also be synchronized with the gPTP GM. Without frequency synchronization, the time of the Slave might still run faster or slower than the GM.

The 5G network supports time synchronization as defined by IEEE 802.1AS across 5G-based logical TSN bridges with Ethernet PDU (Packet Data Unit) session type in the TSN Time Domain. The 5G-based logical TSN bridge needs to calculate the residence time of the 5G network. The 5G network provides an internal system clock for 5G internal synchronization where the base station (gNB), the NW-TT at the UPF side and the device side TST translator (DS-TT) at the User Equipment (UE) side should all be synchronized in the 5G Time Domain with the 5G GM for residence time calculation.

IEEE 802.1Qbv comprises the IEEE "Standard for Local and Metropolitan Area Networks-Media Access Control (MAC) Bridges and Virtual Bridged Local Area Networks Amendment: Enhancements for Scheduled Traffic" which defines the timed-gate mechanism for the transmission of time-critical frames in local and metropolitan area networks using gPTP. As illustrated by FIG. 1, the gate is opened at the scheduled time, and the time-critical frame is allowed to pass when the gate is opened. The TSN bridges should be fully clock synchronized with the TSN GM to ensure the bridges' gates are opened/closed at the scheduled time for transmitting the time-critical frame. IEEE 802.1Qbv makes sure the "$T_{receive}$" is deterministic, and it is a commonly-used protocol in industrial automation and automotive in-vehicle network.

The TSN bridges and end-stations use IEEE 802.1AS for time synchronization. Residence time is the time between the synchronization ("sync") message being received at the TSN bridge ingress port and transmitted at the TSN bridge egress port. This time is a part of the link delay between the TSN end-stations. The residence time calculation needs to be accurate to support IEEE 802.1Qbv high-precision timed-gate mechanism in the TSN network.

TSN over 5G systems brings numerous benefits to communication networks, but these do not come without challenges.

What is desired among other things is a method for determining DS-TT ingress residence time, and a method for synchronizing the timing of the DS-TT module with the TSN GM.

OBJECTS OF THE INVENTION

An object of the invention is to mitigate or obviate to some degree one or more problems associated with known methods of supporting high precision time synchronization of TSN end stations over the communications network.

The above object is met by the combination of features of the main claims; the sub-claims disclose further advantageous embodiments of the invention.

Another object of the invention is to provide a novel method and system to assist time synchronization of a DS-TT module with the TSN GM.

A further object is to provide a novel method of determining DS-TT ingress residence time.

Yet another object is to provide a novel method of calculating a frequency rate ratio at a NW-TT module.

One skilled in the art will derive from the following description other objects of the invention. Therefore, the foregoing statements of object are not exhaustive and serve merely to illustrate some of the many objects of the present invention.

SUMMARY OF THE INVENTION

Provided is method of time synchronization between a DS-TT module inside a logical TSN bridge of a communication network with a TSN Grandmaster (GM) in a TSN Time Domain of the communication network. The method comprises, at a NW-TT module inside the logical TSN bridge, determining a frequency rate ratio between a main communication network Time Domain clock frequency ($f_{5GS}$) and a TSN Time Domain clock frequency ($f_{TSN}$). Then, using the frequency rate ratio and respective times of receipt of a TSN GM synchronization message at an ingress port of the NW-TT module and at an ingress port of the DS-TT module to determine a DS-TT ingress residence time ($R_{DS-TT}$). Then, using the $R_{DS-TT}$ to synchronize the DS-TT module with the TSN GM.

In a first main aspect, the invention provides a method of time synchronization between a DS-TT module inside a logical TSN bridge of a communication network with a TSN GM in a TSN Time Domain of the communication network, the method comprising the steps of: at a NW-TT module inside the logical TSN bridge of the communication network, determining a frequency rate ratio between a main communication network Time Domain clock frequency ($f_{5GS}$) and a TSN Time Domain clock frequency ($f_{TSN}$); using the frequency rate ratio and respective times of receipt of a TSN GM synchronization message at an ingress port of the NW-TT module and at an ingress port of the DS-TT module to determine a DS-TT ingress residence time ($R_{DS-TT}$), the $R_{DS-TT}$ being related to a time between the TSN GM synchronization message being received at the ingress port of the NW-TT module and the TSN GM synchronization message being received at the ingress port of the DS-TT module; and using the $R_{DS-TT}$ to synchronize the DS-TT module with the TSN GM.

In a second main aspect, the invention provides a method of calculating a frequency rate ratio at a NW-TT module inside a logical TSN bridge of a communication network, the method comprising the steps of: retrieving a main communication network Time Domain clock frequency ($f_{5GS}$) from a hardware register of a main communication network clock ($Clock_{5GS}$) in the NW-TT module, the main communication network clock ($Clock_{5GS}$) being synchronized with a main communication network GM in the main communication network Time Domain of the communication network, retrieving a TSN Time Domain clock frequency ($f_{TSN}$) from a hardware register of a TSN clock ($Clock_{TSN}$) in the NW-TT module, the TSN clock ($Clock_{TSN}$) being synchronized with a TSN GM in the TSN Time Domain of the communication network; and calculating the frequency rate ratio from: frequency rate ratio (rateRatio)=$f_{5GS}/f_{TSN}$.

In a third main aspect, the invention provides a method of time synchronization between a DS-TT module inside a logical TSN bridge of a communication network with a TSN Grandmaster (GM) in a TSN Time Domain of the communication network, the method comprising the steps of: determining a DS-TT ingress residence time ($R_{DS-TT}$), the $R_{DS-TT}$ being related to a time between a TSN GM synchronization message being received at an ingress port of a Network-Side Time-Sensitive Networking (TSN) Translator (NW-TT) module inside the logical TSN bridge of the communication network and the TSN GM synchronization message being received at the ingress port of the DS-TT module; and using the $R_{DS-TT}$ to synchronize the DS-TT module with the TSN GM.

In a fourth main aspect, the invention provides a non-transitory computer-readable medium storing machine-readable instructions, wherein, when the machine-readable instructions are executed by a processor, they configure the processor to implement the methods of the first to third main aspects of the invention.

The summary of the invention does not necessarily disclose all the features essential for defining the invention; the invention may reside in a sub-combination of the disclosed features.

The forgoing has outlined fairly broadly the features of the present invention in order that the detailed description of the invention which follows may be better understood. Additional features and advantages of the invention will be described hereinafter which form the subject of the claims of the invention. It will be appreciated by those skilled in the art that the conception and specific embodiment disclosed may be readily utilized as a basis for modifying or designing other structures for carrying out the same purposes of the invention.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

Figure 1:
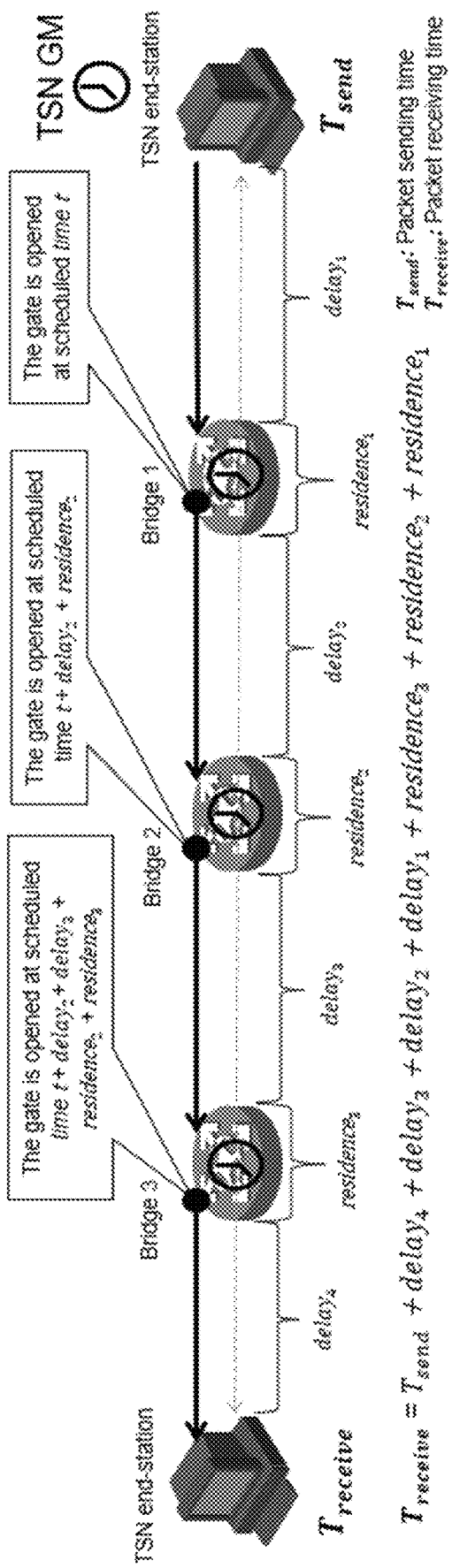
FIG. 1 illustrates known delay and residence times in an IEEE 802.1AS and IEEE 802.1Qbv compliant TSN Network.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the drawings may be implemented in various forms of hardware, software, or combinations thereof. These elements may be implemented in a combination of hardware and software on one or more appropriately programmed general-purpose devices, which may include a processor, memory, and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems and devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode, or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

References to 5G radio equipment in the following description do not exclude the application of the methods described herein to radio equipment of compatible mobile communications systems.

The following description describes implementation of the present invention in a 5G communications network by way of example, but without limitation to implementation of the invention in suitable communications networks.

Figure 2:
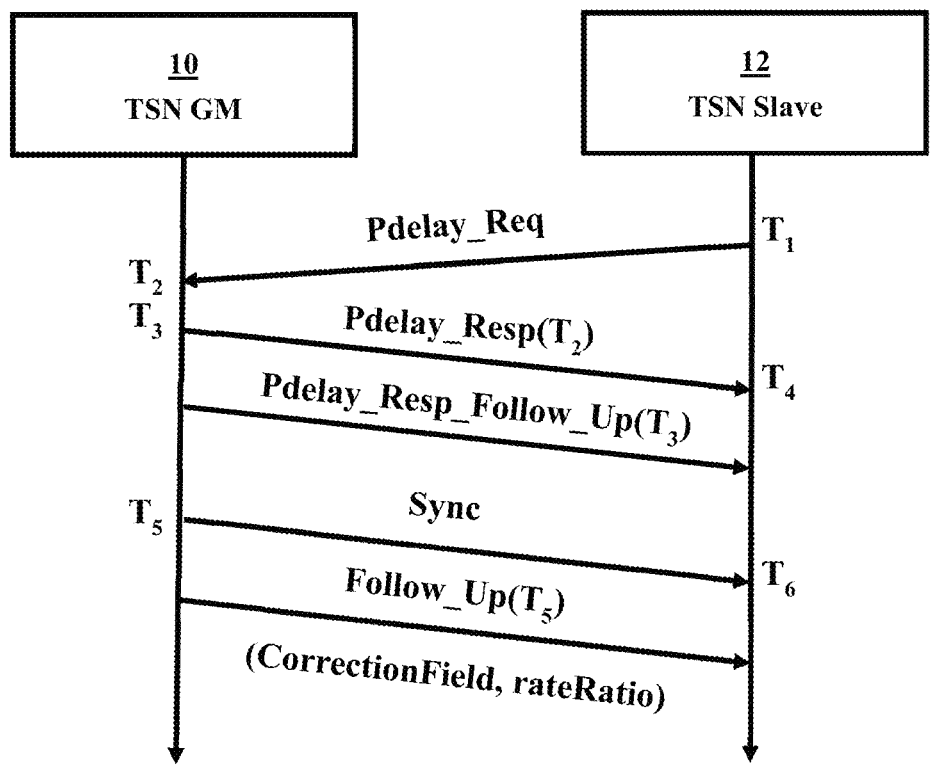
FIG. 2 is a timing diagram for time synchronization of time-sensitive applications in local and metropolitan area networks in accordance with IEEE 802.1AS.

FIG. 2 provides a timing diagram for time synchronization of time-sensitive applications in local and metropolitan area networks in accordance with IEEE 802.1AS by way of example of a known timing offset adjustment method.

IEEE 802.1AS provides protocols, procedures, and managed objects for the transport of timings over local and metropolitan area networks.

Referring to FIG. 2, the timing source in the network is generated by a gPTP GM which, in this example, comprises a TSN GM 10. The Slave clock ("TSN Slave") 12 utilizes an offset to adjust its time to agree with the Master clock of the gPTP GM 10.

The steps for determining or calculating the offset includes first calculating a timing delay value related to the "Pdelay_Req" message and the "Pdelay_Response(T2)" message. The timing delay value is given by:

$$\text{Delay} = [(T_2 - T_1) + (T_4 - T_3)]/2.$$

In a next step, a value for the timing offset for adjusting the timing of the Slave clock 12 to agree with the Master clock of the gPTP GM 10 makes use of the timing of the "Synch" message and is given by:

$$\text{Offset} = (T_6 - T_5) - \text{Delay}.$$

Other than the offset timing adjustment, the clock frequency of the Slave clock 12 should also be synchronized with the gPTP GM 10, because, without clock frequency synchronization, the Slave clock 12 may still run faster or slower than the Master clock of the gPTP GM 10 despite the step of adjusting the timing of the Slave clock 12 to agree with the Master clock of the gPTP GM 10 using the determined timing offset value.

The "Follow_Up" message in the timing diagram of FIG. 1 may include a correction field containing the message transit time and residence time as well as the "rateRatio" containing logical syntonization of a time aware system to the gPTP GM 10 frequency rate. The correction field C carries the time elapsed in the timeaware systems and on the links on the path between the gPTP GM 10 and the time-aware system preceding a last hop. The rate ratio allows for logical syntonization of a timeaware system to the gPTP GM 10 frequency rate.

The method of determining a timing offset as illustrated by FIG. 2 can be utilized to provide respective timing offset values between the NW-TT module and the 5G GM in the 5G time domain, the DS-TT module and the 5G GM in the 5G time domain, and the NW-TT module and the TSN GM in the TSN time domain as will be more apparent from the following description. In this example, the 5G GM in the 5G time domain comprises the main communication network GM in the main communication network time domain.

IEEE 802.1AS-2011 defines the gPTP profile which, like all profiles of IEEE 1588, selects options from IEEE 1588, but also generalizes the network architecture to allow PTP to apply beyond wired Ethernet networks.

IEEE 1588 "IEEE Standard for a Precision Clock Synchronization Protocol for Networked Measurement and Control Systems". defines a protocol enabling precise synchronization of clocks in measurement and control systems implemented with technologies such as network communication, local computing, and distributed objects. The protocol is applicable to systems communicating by local area networks supporting multicast messaging including but not limited to Ethernet.

It will be understood therefore that nothing in the following description prevents the method in accordance with the invention being implemented as PTP packets in an IEEE 1588 compliant network as well as gPTP packets in an IEEE 802.1AS compliant network. The method of the invention enables both peer-to-peer mode of time synchronization using gPTP as well as end-to-end mode of time synchronization using PTP.

Figure 3:
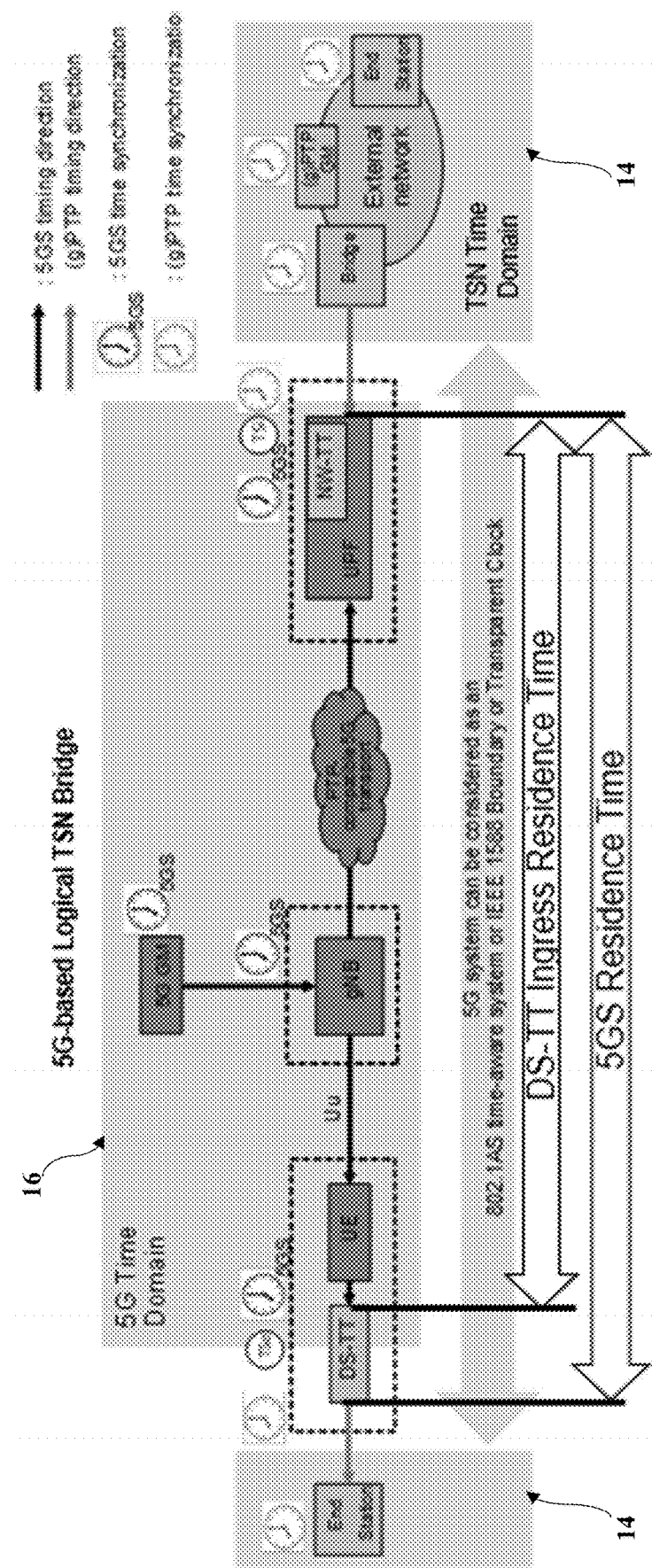
FIG. 3 is a block schematic diagram illustrating the TSN Time Domain and the 5G Time Domain in an IEEE 802.1AS and IEEE 802.1Qbv compliant TSN Network.

FIG. 3 provides a block schematic diagram illustrating the TSN Time Domain 14 and the 5G Time Domain 16 in an IEEE 802.1 AS and IEEE 802.1Qbv compliant TSN Network. The TSN Time Domain 14 for the 5G network supports time synchronization (as defined by IEEE 802.1AS and IEEE 802.1Qbv) across 5G-based logical TSN bridge(s) with Ethernet Packet Data Unit (PDU) session type in the TSN Time Domain 14. The 5G-based logical TSN bridge(s) needs to calculate the residence time of the 5G network. However, whilst the residence time of the 5G network or 5G system (5GS) is defined in the $3^{rd}$ Generation Partnership Project (3GPP) standard, the DS-TT ingress residence time is not defined in the standard. The DS-TT ingress residence time must be calculated when the DS-TT module synchronizes its time with the TSN GM 10 in the TSN time domain 14.

Figure 4:
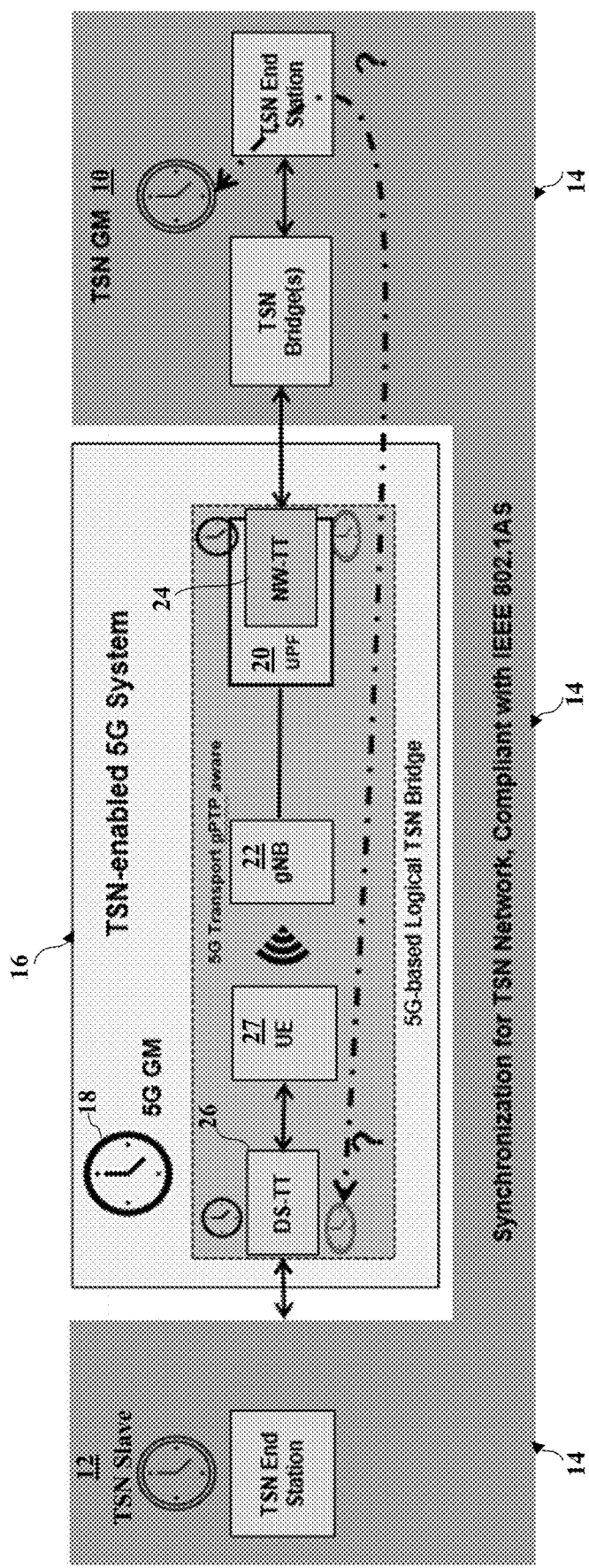
FIG. 4 is a further block schematic diagram illustrating the TSN Time Domain and the 5G Time Domain in an IEEE 802.1AS and IEEE 802.1Qbv compliant TSN Network.

FIG. 4 also provides a block schematic diagram illustrating the TSN Time Domain 14 and the 5G Time Domain 16 in an IEEE 802.1AS and IEEE 802.1Qbv compliant TSN Network. The 5G Time Domain 16 for the 5G network provides an internal system clock for 5G internal synchronization where the gNB 22, the NW-TT 24 at a User Plane Function (UPF) side 20, and the DS-TT 26 at the UE side should all be synchronized in the 5G Time Domain with a 5G GM 18 for 5G network residence time calculation. However, to ensure critical data is transferred deterministically using IEEE 802.1Qbv in the TSN time domain 14, the 5G system as a logical TSN bridge needs to synchronize its time with the TSN GM 10. As a result, as the DS-TT module 26 and NW-TT module 24 comprise two significant components in the TSN-enabled 5G system, the DS-TT module 26 and NW-TT 24 need to synchronize their time with the TSN GM 10. As already stated, however, and as indicated by the dashed arrowed-line in FIG. 4, how the DS-TT module 26 synchronizes its time with the TSN GM 10 is not defined in the 3GPP standard.

The present invention therefore addresses at least the problems of how to calculate the DS-TT ingress residence time, and how to synchronize the DS-TT module 26 with the TSN GM 10.

Figure 5:
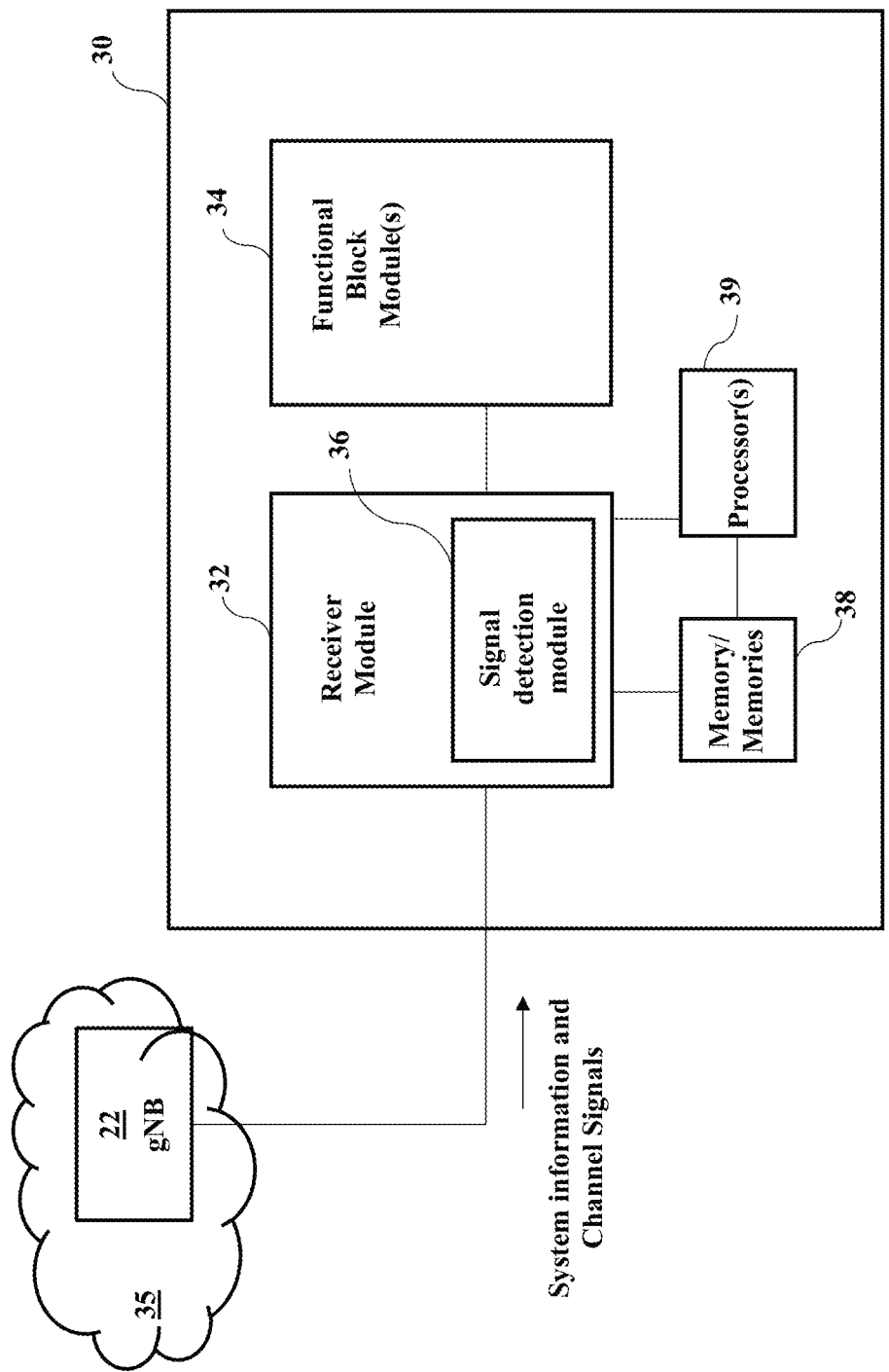
FIG. 5 is a block schematic diagram of an improved radio equipment, device, or network node in accordance with the invention.

FIG. 5 is a block schematic diagram of an improved radio equipment, device, or network node in accordance with the invention. The improved radio equipment device 30 is connected to a gNB 22 operating in a 5G NR communications system environment, although the improved radio equipment device 30 of the invention is not limited to operating in a NR 5G communications system but could comprise a radio equipment device for any suitable communications network.

The radio equipment device 30 may comprise a plurality of functional blocks for performing various functions thereof. For example, the radio equipment device 30 includes receiver module 32 providing received signal processing and configured to provide received signals and/or information extracted therefrom to functional block module(s) 34 such as may comprise various data sink, control element(s), user interface(s), etc. Although receiver module 32 is described as providing received signal processing, it will be appreciated that this functional block may be implemented as a transceiver providing both transmitted and received signal processing. Irrespective of the particular configuration of receiver module 32, embodiments include signal detection module 36 disposed in association with the receiver module 32 for facilitating accurate processing and/or decoding of received information and channel signals in accordance with the invention.

Although the signal detection module 36 is shown as being deployed as part of the receiver module 32 (e.g., comprising a portion of the radio equipment module control and logic circuits), there is no limitation to such a deployment configuration according to the concepts of the invention. For example, the signal detection module 36 may be deployed as a functional block of radio equipment device 30 that is distinct from, but connected to, receiver module 32. The signal detection module 36 may, for example, be implemented using logic circuits and/or executable code/machine readable instructions stored in a memory 38 of the radio equipment device 30 for execution by a processor 39 to thereby perform functions as described herein. For example, the executable code/machine readable instructions may be stored in one or more memories 38 (e.g., random access memory (RAM), read only memory (ROM), flash memory, magnetic memory, optical memory, or the like) suitable for storing one or more instruction sets (e.g., application software, firmware, operating system, applets, and/or the like), data (e.g., configuration parameters, operating parameters and/or thresholds, collected data, processed data, and/or the like), etc. The one or more memories 38 may comprise processor-readable memories for use with respect to one or more processors 39 operable to execute code segments of signal detection module 36 and/or utilize data provided thereby to perform functions of the signal detection module 36 as described herein. Additionally, or alternatively, the signal detection module 36 may comprise one or more special purpose processors (e.g., application specific integrated circuit (ASIC), field programmable gate array (FPGA), graphics processing unit (GPU), and/or the like configured to perform functions of the signal detection module 36 as described herein.

Figure 6:
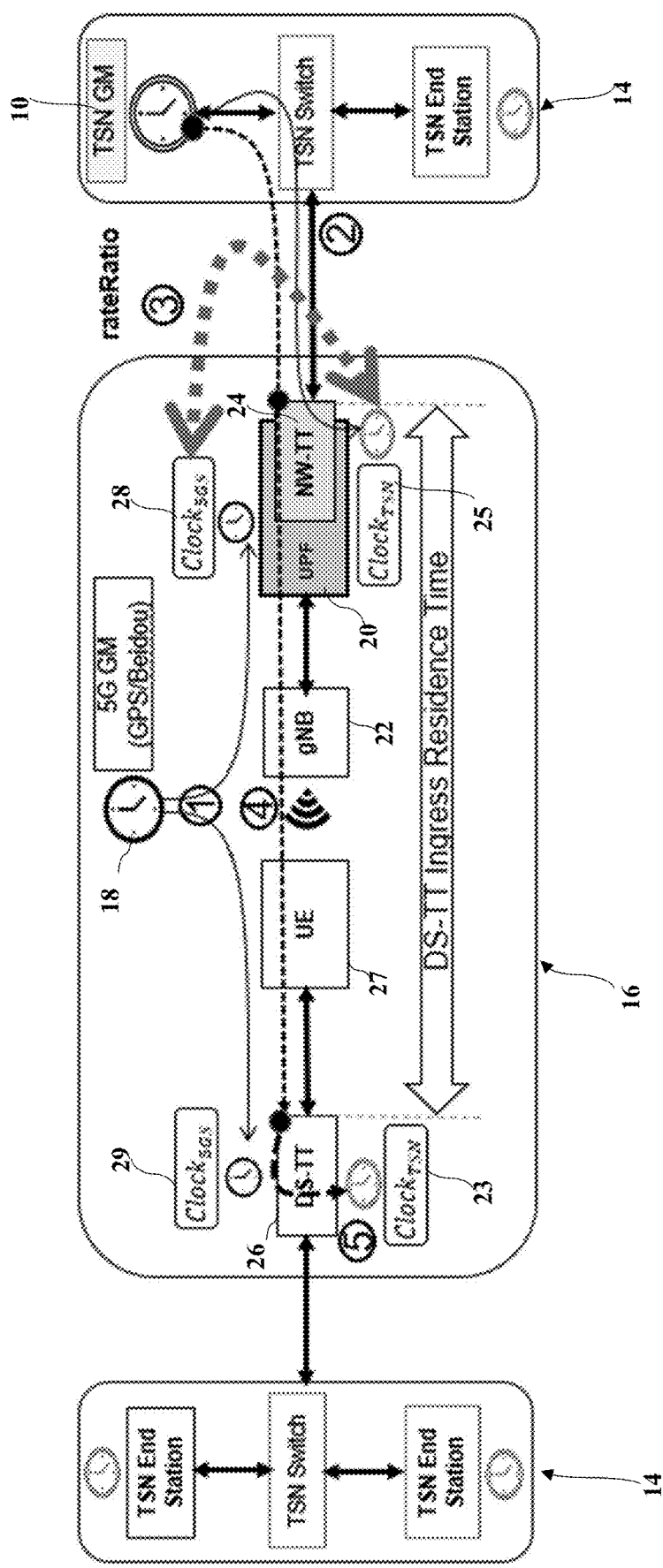
FIG. 6 is a further block schematic diagram illustrating the TSN Time Domain and the 5G Time Domain in an IEEE 802.1AS and IEEE 802.1Qbv compliant TSN Network showing the parts/steps of a preferred method of the invention.

FIG. 6 is a further block schematic diagram illustrating the TSN Time Domain 14 and the 5G Time Domain 16 in an IEEE 802.1AS and IEEE 802.1Qbv compliant TSN Network, but also showing the parts or steps of a preferred embodiment of the method of the invention. In a first part ① of the preferred method of FIG. 6, the method involves calculating respective time offsets to synchronize respective $Clock_{5GS}$ 28, 29 of the NW-TT and DS-TT modules 24, 26 with the 5G GM 18 in the 5G time domain 16.

Figure 7:
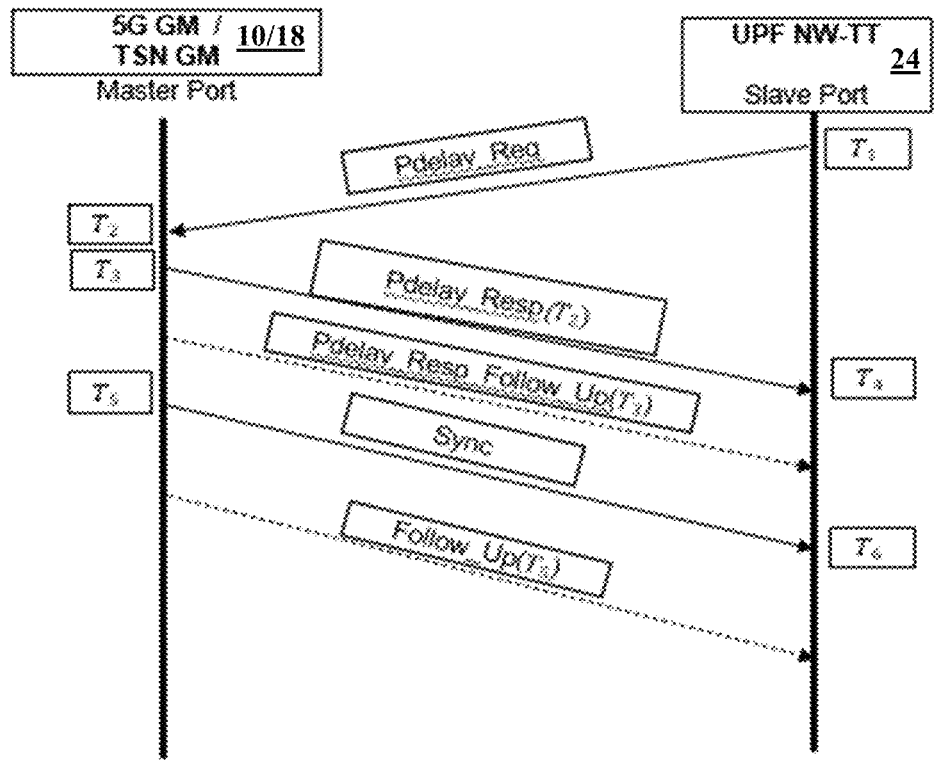
FIG. 7 is a timing diagram for time synchronization of between a NW-TT module and the 5G GM or between the NW-TT module and the TSN GM.

Reference is made to FIG. 7, which provides a timing diagram for time synchronization of the NW-TT module 24 on the UPF 20 with the 5G GM 18 in the 5G time domain 16. The NW-TT module 24 on the UPF 20 receives the gPTP or PTP messages from the gNB 22 with time synchronization information in peer-to-peer mode or end-to-end mode. The message timings comprise:

$T_1$: time Clock$_{5GS}$ 28 of the NW-TT module 24 sends a pdelay request message to the 5G GM 18;

$T_2$: time the 5G GM 18 receives a pdelay request message from the NW-TT module 24;

$T_3$: time the 5G GM 18 sends a pdelay reply message to the NW-TT module 24;

$T_4$: time Clock$_{5GS}$ 28 of the NW-TT module 24 receives a pdelay reply message from the 5G GM 18;

$T_5$: time the 5G GM 18 sends a sync message to the NW-TT module 24; and $T_6$: time Clock$_{5GS}$ 28 of the NW-TT module 24 receives the sync message from the 5G GM 18.

The NW-TT module 24 stores a first time $T_1$ relating to sending a PTP or gPTP Pdelay_Req message to the 5G GM 18, stores a fourth time $T_4$ relating to receiving a PTP or gPTP Pdelay_Resp message from the 5G GM 18, extracts a second time $T_2$ from a PTP or gPTP Pdelay_Resp message received from the 5G GM 18, and extracts a third time $T_3$ from a PTP or gPTP Pdelay_Resp_Follow_Up message received from the 5G GM 18. The NW-TT module 24 then calculates a time delay (GM_Delay$_{NW-TT}$) between the 5G GM 18 and the NW-TT module 24 using the formula:

$$\text{GM\_Delay}_{NW-TT} = [(T_2 - T_1) + (T_4 - T_3)]/2.$$

The NW-TT module 24 stores a sixth time $T_6$ relating to receiving a PTP or gPTP Sync message from the 5G GM 18 and extracts a fifth time $T_5$ from a PTP or gPTP Follow_Up message. The NW-TT module 24 calculates a timing offset value GM_Offset$_{NW-TT}$ using the GM_Delay$_{NW-TT}$ using the formula:

$$\text{GM\_Offset}_{NW-TT} = (T_6 - T_5) - \text{GM\_Delay}_{NW-TT}.$$

Finally, the NW-TT module 24 on the UPF 20 uses the GM_Offset$_{NW-TT}$ to synchronize the Clock$_{5GS}$ 28 time of the NW-TT module 24 with the 5G GM 18.

Figure 8:
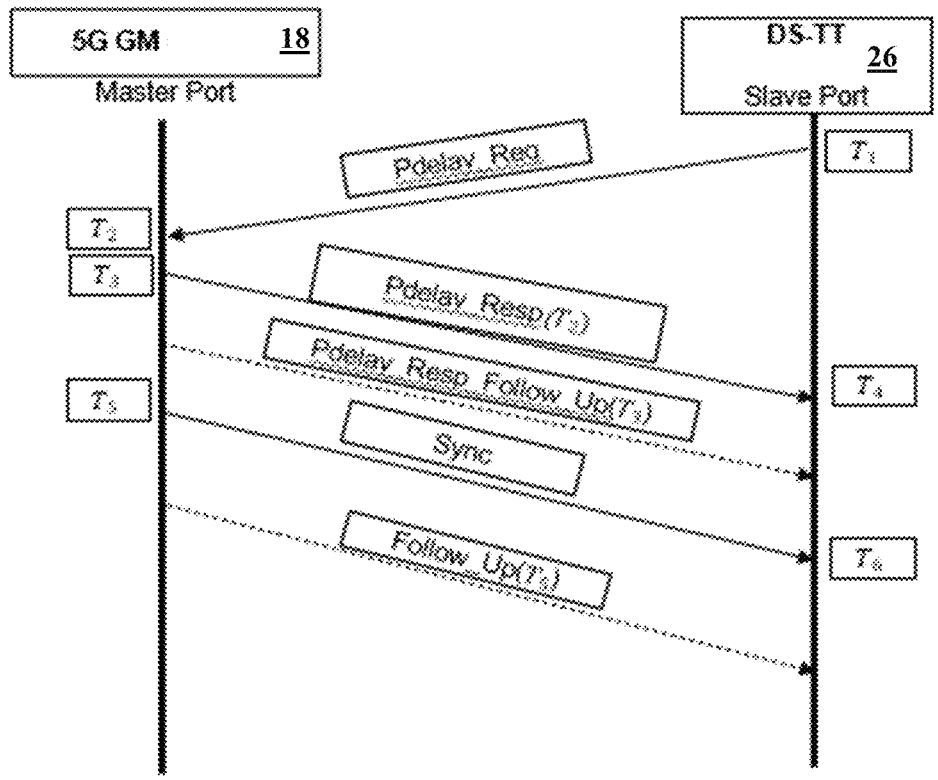
FIG. 8 is a timing diagram for time synchronization of between a DS-TT module and the 5G GM.

Reference is made to FIG. 8, which provides a timing diagram for time synchronization of the DS-TT module 26 on the UE 27 with the 5G GM 18 in the 5G time domain 16. The DS-TT module 26 on the UE 27 receives the gPTP or PTP messages from the gNB 22 with time synchronization information in peer-to-peer mode or end-to-end mode.

The message timings comprise;

$T_1$: time Clock$_{5GS}$ 29 of the DS-TT module 26 sends a pdelay request message to the 5G GM 18;

$T_2$: time the 5G GM 18 receives a pdelay request message from the DS-TT module 26;

$T_3$ time the 5G GM 18 sends a pdelay reply message to the DS-TT module 26;

$T_4$: time Clock$_{5GS}$ 29 of the DS-TT module 26 receives a pdelay reply message from the 5G GM 18;

$T_5$: time the 5G GM 18 sends a sync message to the DS-TT module 26; and $T_6$: time Clock$_{5GS}$ 29 of the DS-TT module 26 receives the sync message from the 5G GM 18.

The DS-TT module 26 stores a first time $T_1$ relating to sending a PTP or gPTP Pdelay_Req message to the 5G GM 18, stores a fourth time $T_4$ relating to receiving a PTP or gPTP Pdelay_Resp message from the 5G GM 18, extracts a second time $T_2$ from a PTP or gPTP Pdelay_Resp message received from the 5G GM 18, and extracts a third time $T_3$ from a PTP or gPTP Pdelay_Resp_Follow_Up message received from the 5G GM 18. The DS-TT module 26 then calculates a time delay (GM_Delay$_{DS-TT}$) between the 5G GM 18 and the DS-TT module 26 using the formula:

$$\text{GM\_Delay}_{DS-TT} = [(T_2 - T_1) + (T_4 - T_3)]/2.$$

The DS-TT module 26 stores a sixth time $T_6$ relating to receiving a PTP or gPTP Sync message from the 5G GM 18 and extracts a fifth time $T_5$ from a PTP or gPTP Follow_Up message. The DS-TT module 26 calculates a timing offset value GM_Offset$_{DS-TT}$ using the GM_Delay$_{DS-TT}$ using the formula:

$$\text{GM\_Offset}_{DS-TT} = (T_6 - T_5) - \text{GM\_Delay}_{DS-TT}.$$

Finally, the DS-TT module 26 on the UE 27 uses the GM_Offset$_{DS-TT}$ to synchronize the Clock$_{5GS}$ 29 time of the DS-TT module 26 with the 5G GM 18.

In a second part ② of the preferred method of FIG. 6, the method involves calculating a time offset to synchronize Clock$_{TSN}$ 25 of the NW-TT module 24 with the TSN GM 10 in the TSN time domain 14.

Reference is made again to FIG. 7, which also provides a timing diagram for time synchronization of the NW-TT module 24 on the UPF 20 with the TSN GM 10 in the TSN time domain 14. The NW-TT module 24 on the UPF 20 receives the gPTP or PTP messages from the gNB 22 with time synchronization information in peer-to-peer mode or end-to-end mode. The message timings comprise;

$T_1$: time Clock$_{TNS}$ 25 of the NW-TT module 24 sends a pdelay request message to the TSN GM 10;

$T_2$: time the TSN GM 10 receives a pdelay request message from the NW-TT module 24;

$T_3$: time the TSN GM 10 sends a pdelay reply message to the NW-TT module 24;

$T_4$: time Clock$_{TNS}$ 25 of the NW-TT module 24 receives a pdelay reply message from the TSN GM 10;

$T_5$: time the TSN GM 10 sends a sync message to the NW-TT module 24; and $T_6$: time Clock$_{TNS}$ 25 of the NW-TT module 24 receives the sync message from the TSN GM 10.

The method follows the same logical steps as above with the result that the NW-TT module 24 then calculates a time delay (TSN_Delay$_{NW-TT}$) between the TSN GM 10 and the NW-TT module 24 using the formula:

$$\text{TSN\_Delay}_{NW-TT} = [(T_2 - T_1) + (T_4 - T_3)]/2.$$

The NW-TT module 24 then calculates a timing offset value TSN_Offset$_{NW-TT}$ using the TSN_Delay$_{NW-TT}$ using the formula:

$$\text{TSN\_Offset}_{NW-TT} = (T_6 - T_5) - \text{TSN\_Delay}_{NW-TT}.$$

Finally, the NW-TT module 24 on the UPF 20 uses the TSN_Offset$_{NW-TT}$ to synchronize the Clock$_{TNS}$ 25 of the NW-TT module 24 with the TSN GM 10.

Figure 9:
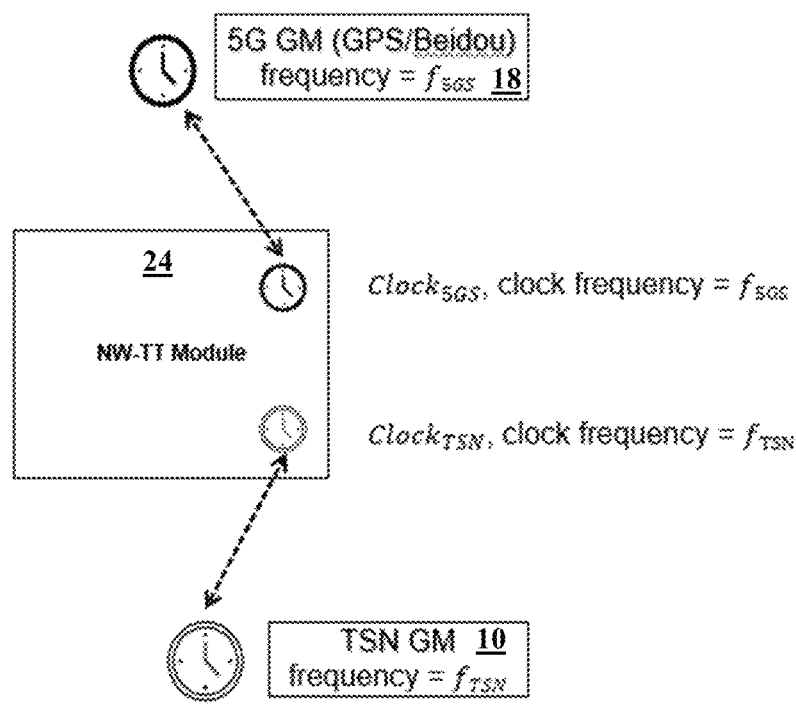
FIG. 9 is a block diagram illustrating calculation of a frequency rate ratio at the NW-TT module.

In a third part ③ of the preferred method of FIG. 6, the NW-TT module 24 on the UPF 20 calculates a frequency rate ratio ("rateRatio") between the 5G time domain 16 and the TSN time domain 14 as shown in FIG. 9. The rateRatio is calculated between the 5G Time Domain clock frequency ($f_{5GS}$) and the TSN Time Domain clock frequency ($f_{TSN}$) using the following formula:

$$rateRatio = \frac{f5GS}{fTSN}$$

The 5G Time Domain clock frequency ($f_{5GS}$) is preferably retrieved from a hardware register of the 5G clock ($Clock_{5GS}$) 28 in the NW-TT module 24, the 5G clock ($Clock_{5GS}$) 28 having been synchronized with the 5G GM 18 in the 5G Time Domain 16, and the TSN Time Domain clock frequency ($f_{TSN}$) is preferably retrieved from a hardware register of the TSN clock ($Clock_{TSN}$) 29 in the NW-TT module 24, the TSN clock ($Clock_{TSN}$) 29 having been synchronized with the TSN GM 10 in the TSN Time Domain 14.

Figure 10:
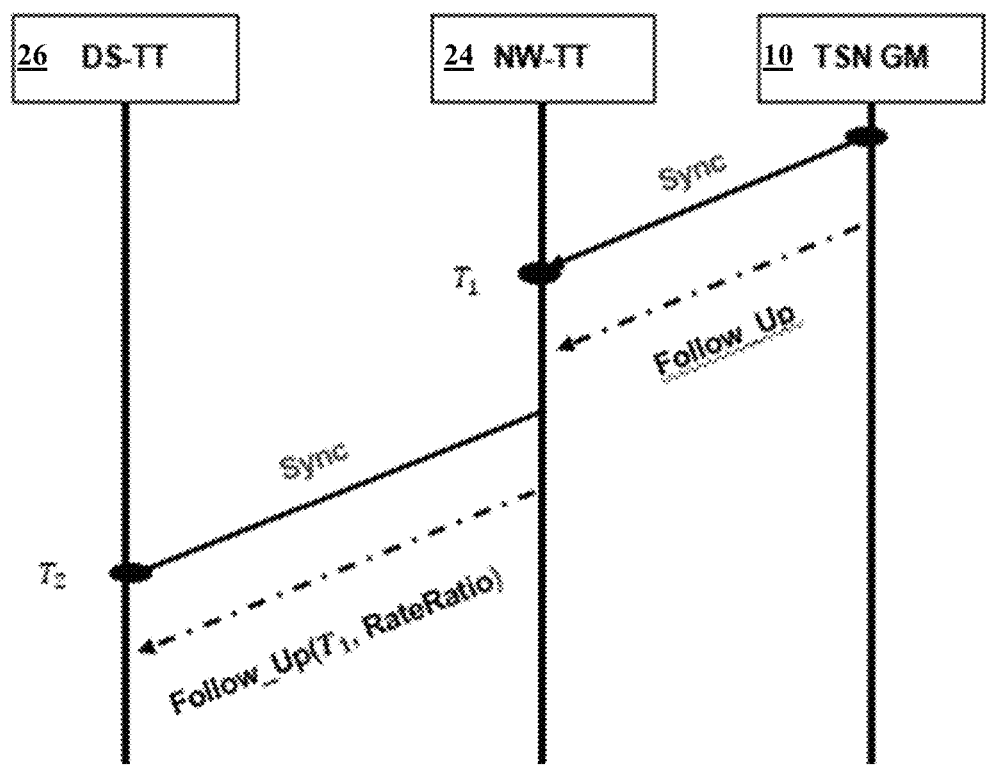
FIG. 10 is a timing diagram for synchronization messaging between the TSN GM, the NW-TT module and the DS-TT module.

Reference is made to FIGS. 9 and 10. In a fourth part ④ of the preferred method of FIG. 6, the DS-TT module 26 on the UE 27 calculates the DS-TT ingress residence time ($R_{DS-TT}$), the $R_{DS-TT}$ being related to a time between the TSN GM synchronization message being received at the ingress port of the NW-TT module 24 and the TSN GM synchronization message being received at the ingress port of the DS-TT module 26. The DS-TT Ingress Residence Time is calculated by the DS-TT module 26 using the following formula:

$$R_{DS-TT} = (T_2 - T_1)/rateRatio$$

where;

$T_1$ is the time of receipt of the TSN synchronization message at the ingress port of the NW-TT module 24; and $T_2$ is the time of receipt of the TSN synchronization message at the ingress port of the DS-TT module 26.

The rateRatio value calculated in the third part ③ of the method is transferred to the DS-TT module 26 in a Follow_Up message from the NW-TT module 24 to the DS-TT module 26.

Figure 11:
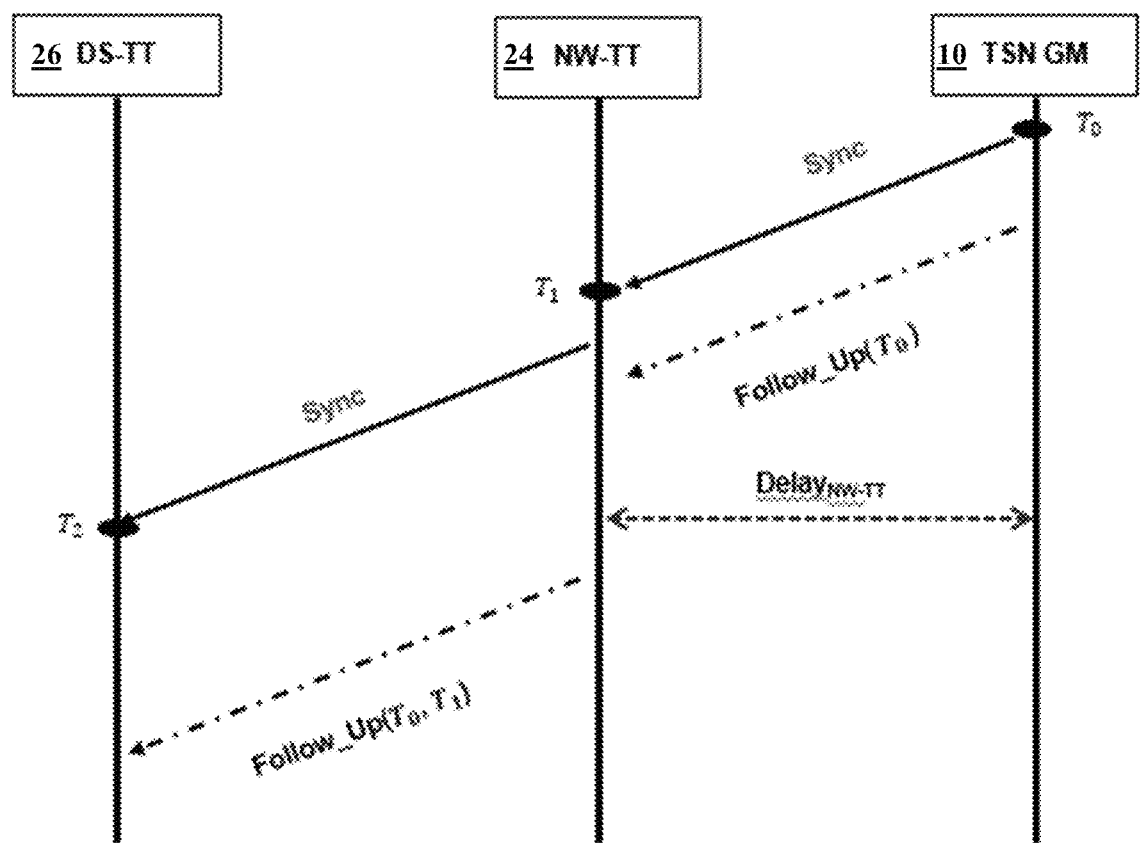
FIG. 11 is a further timing diagram for synchronization messaging between the TSN GM, the NW-TT module and the DS-TT module.

In a fifth part ⑤ of the preferred method of FIG. 6, the DS-TT module 26 on the UE 27 stores the time $T_2$ (FIG. 11) of receiving the sync message from the NW-TT module 24 and extracts the time $T_6$ from the Follow_Up message received from the NW-TT module 24. The DS-TT module 26 calculates an offset time ($Offset_{DS-TT}$) between the TSN GM 10 and the DS-TT module 26 based on the formula:

$$Offset_{DS-TT} = (T_2 - T_0) - TSN\_Delay_{NW-TT} - R_{DS-TT};$$

where:

$T_0$ is the time of sending the TSN synchronization message from the TSN GM 10 to the NW-TT module 24;

$T_2$ is the time of receipt of the TSN synchronization message at the ingress port of the DS-TT module 26; and $TSN\_Delay_{NW-TT}$ is the time delay between the TSN GM 10 and the NW-TT module 24.

The NW-TT module 24 on the on UPF 20 uses the $Offset_{DS-TT}$ to synchronize the sync the $Clock_{TSN}$ timer 23 of the DS-TT module 26 with the TSN GM 10.

The invention also provides a method of calculating a frequency rate ratio "rateRatio" at the NW-TT module 24 by retrieving the 5G Time Domain clock frequency ($f_{5GS}$) from a hardware register of the 5G clock ($Clock_{5GS}$) in the NW-TT module 24 and retrieving the TSN Time Domain clock frequency ($f_{TSN}$) from a hardware register of the TSN clock ($Clock_{TSN}$) in the NW-TT module 24 and calculating the frequency rate ratio from: frequency rate ratio (rateRatio)=$f_{5GS}/f_{TSN}$.

The invention also provides a non-transitory computer-readable medium storing machine-readable instructions, wherein, when the machine-readable instructions are executed by a processor, they configure the processor to implement the method of any one of the appended method claims.

The apparatus described above may be implemented at least in part in software. Those skilled in the art will appreciate that the apparatus described above may be implemented at least in part using general purpose computer equipment or using bespoke equipment.

Here, aspects of the methods and apparatuses described herein can be executed on any apparatus comprising the communication system. Program aspects of the technology can be thought of as "products" or "articles of manufacture" typically in the form of executable code and/or associated data that is carried on or embodied in a type of machine-readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A method of time synchronization between a Device-Side Time-Sensitive Networking (TSN) Translator (DS-TT) module inside a logical TSN bridge of a communication network and a TSN Grandmaster (GM) in a TSN Time Domain of the communication network, the method comprising the steps of:
   at a Network-Side TSN Translator (NW-TT) module inside the logical TSN bridge of the communication network, determining a frequency rate ratio between a main communication network Time Domain clock frequency ($f_{5GS}$) and a TSN Time Domain clock frequency ($f_{TSN}$);
   using the frequency rate ratio and respective times of receipt of a TSN GM synchronization message at an ingress port of the NW-TT module and at an ingress port of the DS-TT module to determine a DS-TT ingress residence time ($R_{DS\text{-}TT}$), the $R_{DS\text{-}TT}$ being related to a time between the TSN GM synchronization message being received at the ingress port of the NW-TT module and the TSN GM synchronization message being received at the ingress port of the DS-TT module; and
   using the $R_{DS\text{-}TT}$ to synchronize the DS-TT module with the TSN GM.

2. The method of claim 1, wherein the steps of the method are implemented by an exchange of one or more Precision Time Protocol (PTP) or Generalized Precision Time Protocol (gPTP) messages between a main communication network Grandmaster (GM) and the NW-TT module and the DS-TT module in the main communication network Time Domain and by an exchange of one or more PTP or gPTP messages between the TSN GM and the NW-TT module in the TSN time domain.

3. The method of claim 1, wherein the frequency rate ratio is determined from:

$$\text{frequency rate ratio}\ (rateRatio) = f_{5GS}/f_{TSN}.$$

4. The method of claim 1, wherein the main communication network Time Domain clock frequency ($f_{5GS}$) is retrieved from a hardware register of a main communication network clock ($Clock_{5GS}$) in the NW-TT module, the main communication network clock ($Clock_{5GS}$) being synchronized with the main communication network GM in the main communication network Time Domain, and the TSN Time Domain clock frequency ($f_{TSN}$) is retrieved from a hardware register of a TSN clock ($Clock_{TSN}$) in the NW-TT module, the TSN clock ($Clock_{TSN}$) being synchronized with the TSN GM in the TSN Time Domain.

5. The method of claim 1, wherein the $R_{DS\text{-}TT}$ is determined from:

$$R_{DS\text{-}TT} = (T_2 - T_1)/rateRatio;$$

where:
rateRatio=frequency rate ratio;
$T_1$ is the time of receipt of the TSN synchronization message at the ingress port of the NW-TT module; and
$T_2$ is the time of receipt of the TSN synchronization message at the ingress port of the DS-TT module.

6. The method of claim 1, wherein the $R_{DS\text{-}TT}$ is transferred from the NW-TT module to the DS-TT module after the TSN synchronization message has been issued by the TSN GM.

7. The method of claim 6, wherein the $R_{DS\text{-}TT}$ is transferred from the NW-TT module to the DS-TT module in a follow-up message.

8. The method of claim 6, wherein the $R_{DS\text{-}TT}$ is calculated by the DS-TT module of a User Equipment (UE) in the logical TSN bridge of the communication network.

9. The method of claim 1, wherein the step of using the $R_{DS\text{-}TT}$ to synchronize the DS-TT module with the TSN GM comprises:
   using the $R_{DS\text{-}TT}$ to determine a time deviation between the TSN GM and the DS-TT module; and
   using the determined time deviation to synchronize a TSN clock ($Clock_{TSN}$) in the DS-TT module with the TSN GM.

10. The method of claim 9, wherein the time deviation comprises an offset time ($Offset_{DS\text{-}TT}$) between the TSN GM and the DS-TT module, a value of the $Offset_{DS\text{-}TT}$ being determined from:

$$Offset_{DS\text{-}TT} = (T_2 - T_0) - TSN\_Delay_{NW\text{-}TT} - R_{DS\text{-}TT};$$

where:
$T_0$ is the time of sending the TSN synchronization message from the TSN GM to the NW-TT module;
$T_2$ is the time of receipt of the TSN synchronization message at the ingress port of the DS-TT module; and
$TSN\_Delay_{NW\text{-}TT}$ is a time delay between the TSN GM and the NW-TT module.

11. The method of claim 10, wherein one or more PTP or gPTP messages exchanged between the TSN GM and the NW-TT module contain synchronization information in peer-to-peer mode or end-to-end mode and the method comprises the steps of:
   storing a first time $T_1$ relating to sending a PTP or gPTP Pdelay_Req message;
   extracting a second time $T_2$ from a PTP or gPTP Pdelay_Resp message;
   extracting a third time $T_3$ from a PTP or gPTP Pdelay_Resp_Follow_Up message;
   storing a fourth time $T_4$ relating to receiving a PTP or gPTP Pdelay_Resp message; and
   determining $TSN\_Delay_{NW\text{-}TT}$ from the formula:

$$TSN\_Delay_{N3} = [(T_2 - T_1) + (T_4 - T_3)]/2.$$

12. The method of claim 11, comprising the steps of:
extracting a fifth time $T_5$ from a PTP or gPTP Follow_Up message;
storing a sixth time $T_0$ relating to receiving a PTP or gPTP Sync message; and
determining the TSN NW-TT time offset value (TSN_Offset$_{NW-TT}$) between the TSN GM and the NW-TT module from the formula:

$$\text{TSN\_Offset}_{NW-TT} = (T_6 - T_5) - \text{TSN\_Delay}_{NW-TT}.$$

13. A method of time synchronization between a Device-Side Time-Sensitive Networking (TSN) Translator (DS-TT) module inside a logical TSN bridge of a communication network and a TSN Grandmaster (GM) in a TSN Time Domain of the communication network, the method comprising the steps of:
determining a DS-TT ingress residence time ($R_{DS-TT}$), the $R_{DS-TT}$ being related to a time between a TSN GM synchronization message being received at an ingress port of a Network-Side Time-Sensitive Networking (TSN) Translator (NW-TT) module inside the logical TSN bridge of the communication network and the TSN GM synchronization message being received at the ingress port of the DS-TT module; and
using the $R_{DS-TT}$ to synchronize the DS-TT module with the TSN GM.

14. The method of claim 13, wherein the step of using the $R_{DS-TT}$ to synchronize the DS-TT module with the TSN GM comprises:
using the $R_{DS-TT}$ to determine a time deviation between the TSN GM and the DS-TT module; and
using the determined time deviation to synchronize a TSN clock (Clock$_{TSN}$) in the DS-TT module with the TSN GM.

15. The method of claim 14, wherein the time deviation comprises an offset time (Offset$_{DS-TT}$) between the TSN GM and the DS-TT module, a value of the Offset$_{DS-TT}$ being determined from:

$$\text{Offset}_{DS-TT} = (T_2 - T_0) - \text{Delay}_{NW-TT} - R_{DS-TT};$$

where:
$T_0$ is the time of sending the TSN synchronization message to the NW-TT module;
$T_2$ is the time of receipt of the TSN synchronization message at the ingress port of the DS-TT module;
Delay$_{NW-TT}$ is a time delay between the TSN GM and the NW-TT module.

* * * * *